(12) United States Patent
Ishino et al.

(10) Patent No.: US 7,993,697 B2
(45) Date of Patent: *Aug. 9, 2011

(54) PACKED FROZEN SUSHI PRODUCT AND METHODS FOR PREPARING AND FOR COOKING THE SAME

(75) Inventors: Yuji Ishino, Ishikawa (JP); Hironobu Kadoya, Ishikawa (JP)

(73) Assignee: Polar Starco., Ltd. (JP)

( * ) Notice: Subject to any disclaimer, the term of this patent is extended or adjusted under 35 U.S.C. 154(b) by 782 days.

This patent is subject to a terminal disclaimer.

(21) Appl. No.: 10/570,015

(22) PCT Filed: Aug. 27, 2004

(86) PCT No.: PCT/JP2004/012758
§ 371 (c)(1),
(2), (4) Date: Sep. 28, 2006

(87) PCT Pub. No.: WO2005/020710
PCT Pub. Date: Mar. 10, 2005

(65) Prior Publication Data
US 2007/0014900 A1 Jan. 18, 2007

(30) Foreign Application Priority Data
Aug. 29, 2003 (JP) .................. 2003-308141

(51) Int. Cl.
*A23B 4/06* (2006.01)
*B65B 55/00* (2006.01)
*B65D 81/34* (2006.01)

(52) U.S. Cl. ........ 426/643; 426/107; 426/234; 426/393; 426/641

(58) Field of Classification Search .................. 426/643, 426/641, 107, 234, 393
See application file for complete search history.

(56) References Cited

U.S. PATENT DOCUMENTS

| D386,081 S | * | 11/1997 | Hayes et al. | .................... D9/425 |
| 5,861,184 A | * | 1/1999 | Ishino et al. | .................... 426/107 |
| 5,863,576 A | * | 1/1999 | Guarino | .................... 426/107 |
| 5,863,578 A | * | 1/1999 | Guarino | .................... 426/113 |

FOREIGN PATENT DOCUMENTS

| JP | 57-063082 | | 9/1982 |
| JP | 3172677 | | 7/1991 |
| JP | 1-201961 A | | 8/1998 |
| JP | 3229766 B2 | | 9/2001 |
| JP | 2001275591 A | * | 10/2001 |

OTHER PUBLICATIONS

Translation of Ishino et al. (JP 2001275591 A), see above.*
International Search Report PCT/JP2004/012758 dated Nov. 29, 2004.
English translation of International Preliminary Examination Report dated May 11, 2006 for PCT/JP2004/012758.

* cited by examiner

*Primary Examiner* — Brent T O'Hern
(74) *Attorney, Agent, or Firm* — Ostrolenk Faber LLP

(57) ABSTRACT

A packed frozen sushi product comprising a vacuumed, frozen and hermetically sealed flexible plastic bag; an open-topped plastic box placed in the bag; and a frozen sushi product contained in the box; in the plastic bag, the box and the frozen sushi product being frozen together in a unified form, the packed frozen sushi product thereby being adapted for microwave cooking. Water vapor emanating from the sushi product in thawing is allowed to flow through a space formed around the sushi material to heat a shaped rice section and a material or materials, thereby diminishing unevenness in temperature distribution after thawing. By virtue thereof, a packed frozen sushi product suitable for mass production is provided.

3 Claims, 4 Drawing Sheets

PACKED FROZEN SUSHI PRODUCT AND METHODS FOR PREPARING AND FOR COOKING THE SAME

CROSS REFERENCE TO RELATED APPLICATIONS

The present application is a 35 U.S.C. §371 national phase conversion of International Application No. PCT/JP2004/012758 filed Aug. 27, 2004, which claims priority from Japanese patent application No. 2003-308141 filed Aug. 29, 2003, incorporated herein by reference.

TECHNICAL FIELD

The present invention relates to a packed frozen sushi product suitable for thawing, and a method for preparing the same, and a method for cooking the same. More particularly, the present invention relates to a microwavable packed frozen sushi product suitable for thawing by means of a microwave oven, and methods for preparing and for cooking the same. Further, the present invention relates to a packed frozen sushi product suitable for thawing by means of a microwave oven, which comprises a sushi product contained in a plastic packing container and vacuum-packed and hermetically sealed in the container made of a plastic film with the sushi product and the container in tight contact with each other and frozen in a unified form, and methods for preparing and for cooking the same.

BACKGROUND ART

For example, in the case of a rod-shaped sushi (bo-zushi), vinegared rice is shaped, and the shaped rice section is topped with a sushi material or materials such as boned and prepared red sea bream, sockeye salmon or tuna together with a thin slice of kombu kelp (shiroita kombu) cooked in a broth seasoned with vinegar, sugar and salt, and resultant is shaped into various shapes such as the rod-shape, and the shaped sushi product is wrapped with a bamboo sheath and placed in a packing bag made of a plastic film and vacuum-packed, the vacuum packed sushi product is frozen with a brine such as ethanol or the (vacuum-packed) shaped sushi product is frozen, and the frozen shaped sushi product is placed in a packing bag made of a plastic film and vacuum-packed to thereby prepare a packed frozen sushi product.

Such a packed frozen sushi product by means of brine freezing is prepared by placing a sushi product in a plastic packing bag, vacuum-packing the sushi product, and brine freezing the vacuum-packed sushi product. Accordingly, no attachment of bacteria to the sushi product or absorption of odor from the coolant gas in the sushi product in a freezing room is caused, and therefore, the packed frozen sushi product is hygienically superior to, for example, a packed frozen sushi product prepared by vacuum-packing a sushi product posterior to freezing of the sushi product by slow freezing such as air-blast freezing, nitrogen or carbon dioxide freezing. In particular, such a packed frozen sushi product frozen by brine freezing can be frozen-stored stably, for example, over a long period of 3 months or longer when stored at a storage temperature of −18° C., or can be stored for 6 months when stored at a storage temperature of −50° C.

However, a packed frozen sushi product which has been frozen-stored need to be thawed before being served at a meal. Methods for thawing a packed frozen sushi product include natural thawing, running water thawing, steam thawing, hot water thawing and microwave thawing. Of these, microwave thawing is quite suitable for thawing of a packed frozen sushi product or the like due to its extremely short thawing time and high thawing yield. For example, in the case of above mentioned rod-shaped sushi product, natural thawing at room temperature requires a thawing time of five hours, whereas microwave thawing enables thawing in a period of 2 to 5 minutes. Accordingly, microwave thawing is capable of instantly responding to demands and thus convenient as compared with natural thawing at room temperature.

However, in the case of microwave thawing, calorific values derived from microwave absorption are different between a sushi material or materials and a rice section, and these are also different in quantity. Further, because a surface portion is intensively heated as compared with a center portion, a portion of the sushi material or materials is likely to be heated to an undesirably high temperature as compared with the rice section. The sushi material or materials are thereby brought into the so-called cooked condition, and the tastes thereof are impaired. Therefore, microwave thawing has not been practically used. In a case of, for example, a boxed sushi product or a rod-shaped sushi product, in general, a rice section is preferably lukewarm, for example, the rice section preferably has temperatures of 15 to 25° C., more preferably 20 to 25° C. although this is dependent upon the type of the sushi product, whereas a sushi material or materials, for example, conger eel or of eel is preferred to have roughly the same temperatures as the rice section, for example, temperature of 10 to 25° C., more preferably 10 to 20° C. although this is dependent upon the type of the sushi material or materials. However, when a packed frozen sushi product is thawed in a microwave oven, the material or materials are heated to relatively high temperatures to impair the taste of the sushi product. Accordingly, it is difficult to effect desired thawing by means of a microwave oven.

Under such circumstances, with a view to solving the problem that in thawing a packed frozen sushi product by means of microwave heating using a microwave oven or the like, a sushi material or materials of a sushi product are liable to be heated to relatively high temperatures to thereby impair taste of the sushi product, the present inventors made a proposal as follows. To wrap a sushi product topped with a sushi material or materials with a plastic wrapping film, place the wrapped sushi product in a plastic packing bag for frozen foods, vacuum the packing bag to vacuum-pack the sushi product, freeze the vacuum-packed sushi product en bloc by brine-freezing in a unified form to prepare a so-called packed frozen sushi product suitable for freeze-storage, and in thawing the thus prepared packed frozen sushi product by means of a microwave oven, terminate heating by the microwave oven in a relatively short time so as not to raise temperatures of the sushi product to undesirably high temperatures, and using water vapor emanating from a heated rice section and prevailing in the plastic wrapping film package during the microwave heating and after removal of the sushi product from the microwave oven, heat the sushi product by steaming with the water vapor generated in the plastic wrapping film package and the residual heat of the rice section to bring a temperature of a portion where the sushi material or materials and the rice section are in contact with each other to 15° C. or higher (see Japanese Patent publication No. 3172677, and the specification of U.S. Pat. No. 5,861,184).

For preparing such a packed frozen sushi product, however, it is necessary to tightly wrap a sushi product with a plastic wrapping film, place the wrapped sushi product in a plastic packing bag for frozen foods, and vacuum and hermetically seal the packing bag to vacuum-pack the sushi product. This procedure should be performed carefully, and such a packed frozen sushi product is difficult to prepare on a large scale. Accordingly, production of such a packed frozen sushi product to meet customers' demands involves many manual labors and much time.

It is an object of the present invention to provide a packed sushi product which is capable of solving the problems inherent in such a conventional frozen sushi product wrapped with a plastic film and which is adapted for thawing by means of a microwave oven.

DISCLOSURE OF INVENTION

The present inventors have found that by placing a sushi product such as a rod-shaped sushi product in a box, placing the sushi product in a flexible packing bag together with the box containing the same, and vacuuming the packing bag, the flexible packing bag collapses under atmospheric pressure with a space left around the sushi product, and the packing bag is hermetically sealed and an inner surface of the packing bag is brought in tight contact with the outer surfaces of the box and the upper surface of the sushi product, and in this condition, the packing bag is frozen, and accordingly, when the packed frozen sushi product is heated in a microwave oven, water vapor permeates the inside of the packing bag to efficiently heat the sushi material or materials by steaming, enabling temperature differences in the thawed sushi product to be diminished. The present inventors have also found that in a sushi product which has just thawed in a microwave oven, there are temperature differences of 40 degrees Centigrade or more between the longitudinal ends of the sushi product and a center portion of the sushi product.

The present invention has been made based on these findings. It is, therefore, an object of the present invention to provide a packed frozen sushi product which can be produced on a large scale and which is adapted for microwave thawing, and a method for preparing the same, and a method cooking the same.

In other words, the present invention resides in a microwavable packed frozen sushi product comprising a vacuumed and hermetically sealed flexible microwave-safe plastic packing bag, an open-topped plastic box placed in the packing bag, and a sushi product placed in the box; a space being formed in the packing bag around the sushi product, an inner surface of the packing bag being in contact with an upper surface of the sushi product, and the packing bag, the box and the sushi product being frozen together in a unified form. Also, the present invention resides in a method for preparing a microwavable packed frozen sushi product, the method comprising disposing a sushi material or materials on a top of a shaped rice section or in the shaped rice section to prepare a sushi product, placing the prepared sushi product in a plastic box, placing the plastic box containing the sushi product in a flexible microwave-safe plastic packing bag, vacuuming and hermetically sealing the packing bag to prepare a vacuum-packed sushi product, and cooling the vacuum-packed sushi product with a refrigerant cooled to a (predetermined) freezing temperature to freeze the packing bag, the box and the sushi product, which are constituents of the packed sushi product, together in a unified form. Further, the present invention resides in a method for cooking a microwavable packed frozen sushi product, the method comprising applying heat to "the microwavable packed frozen sushi product comprising a vacuumed and hermetically sealed flexible microwave-safe plastic packing bag, an open-topped plastic box placed in the packing bag, and a sushi product placed in the box; the constituents being frozen together in a unified form" by microwave heating to thereby bring a temperature of at least a part of an exposed longitudinal end portion of the shaped rice section to 30° C. or higher, followed by termination of the microwave heating, and allowing the resulting packed sushi product to stand for a period of 15 minutes to 1 hour without unpacking to allow water vapor emanating at least from the shaped rice section to flow in a space formed between the sushi product and the box, thereby steaming the shaped rice section and the sushi material or materials to bring temperatures thereof between 15° C. and 30° C. Moreover, the present invention resides in a method for cooking a microwavable packed frozen sushi product, the method comprising applying heat to "the microwavable packed frozen sushi product comprising a vacuumed and hermetically sealed flexible microwave-safe plastic packing bag, an open-topped plastic box placed in the packing bag, and a sushi product placed in the box; the constituents being frozen together in a unified form" by microwave heating to thereby bring a temperature of an exposed longitudinal end of the shaped rice section to 30° C. or higher and bring a temperature of an exposed longitudinal end of the sushi material or materials to 20° C. or higher, followed by termination of the microwave heating, and allowing the resulting packed sushi product to stand for a period of 15 minutes to 1 hour without unpacking to allow water vapor emanating at least from the shaped rice section to flow in a space formed between the sushi product and the box, thereby steaming the shaped rice section and the sushi material or materials to bring temperatures of the shaped rice section and the sushi material or materials between 15° C. and 30° C. In addition, the present invention resides in a method for cooking a microwavable packed frozen sushi product, the method comprising applying heat to "the microwavable packed frozen sushi product comprising a vacuumed and hermetically sealed flexible microwave-safe plastic packing bag, an open-topped plastic box placed in the packing bag, and a sushi product placed in the box; the constituents being frozen together in a unified form" by microwave heating to thereby bring a temperature of an exposed longitudinal end of the shaped rice section to 30° C. or higher and bring a temperature of an exposed longitudinal end of the sushi material or materials to 20° C. or higher, followed by termination of the microwave heating, and allowing the resulting packed sushi product to stand for a period of 15 minutes to 1 hour without unpacking to allow water vapor emanating at least from the shaped rice section to flow in a space formed between the sushi product and the box, thereby steaming the shaped rice section and the sushi material or materials to bring temperatures of the shaped rice section and the sushi material or materials between 15° C. and 25° C. In the present invention, by the vacuuming in the packing procedure, the pressure in the packing bag is brought preferably to a reduced pressure of 600 mmHg or lower, preferably 400 mmHg. Further, in the present invention, the box is a box with no covering and may be a box-, shallow cylinder-, tray- or dish-like container having a rectangular (including square), circular or oval shape when viewed in plan.

BEST MODE FOR CARRYING OUT THE INVENTION

Figure 1:
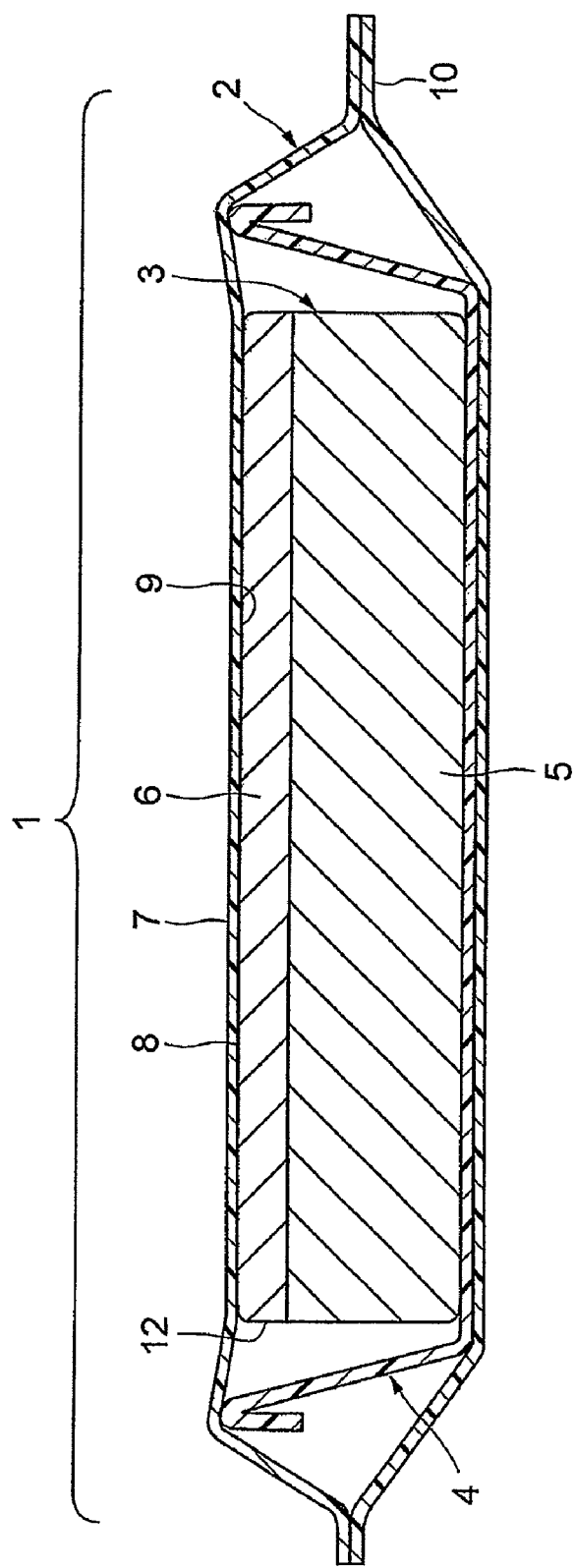
FIG. 1 is a schematic side sectional view schematically illustrating one Embodiment of the present invention.

In the present invention, a sushi product means a rod-shaped sushi product (bo-zushi), a pressed sushi product (oshi-zushi), or a sushi product pressed in a box, i.e., a boxed sushi product (hako-zushi). In the present invention, freezing of a sushi product is performed with the sushi product placed in a box. In this procedure, the sushi product may be placed in the box with its sushi material or materials (gu or sushi neta) up and with its shaped rice section down, or the sushi product may be placed in the box with its shaped rice section up and with its sushi material or materials down. In the present invention, the sushi product may be one having a sushi material or materials as its core such as a rolled sushi product (maki-zushi) or one having a rice-sandwiched sushi material or materials. In the present invention, the sushi product may be placed in an appropriate microwave-transparent rigid or non-rigid plastic box. Preferably, the box is a microwave-transparent plastic box. In the present invention, the box containing the sushi product is placed in a flexible plastic packing bag. In this connection, in order to facilitate vacuuming and cooling of the inside of the box, the box containing the sushi product is placed, with no covering thereon, in the flexible plastic packing bag. The box containing the sushi product is placed in the flexible plastic packing bag, and the packing bag is vacuumed and hermetically sealed, and the vacuumed and sealed packing bag is frozen by brine freezing, air-blast freezing, nitrogen or carbon dioxide freezing or the like. In the present invention, the packed frozen sushi product is such that the plastic box and the sushi product in the packing bag are frozen together in a unified form. In the present invention, the packed frozen sushi product is preferably prepared by cooling the flexible plastic packing bag which contains the box containing the sushi product and which has been vacuumed and hermetically sealed to freeze the inside of the packing bag because a refrigerant does not directly contact the sushi product and because cooling efficiency is improved. Further, in the present invention, the sushi products processed into packed frozen sushi products include sushi products of shaped rice topped with a sushi material or materials, for example, a sushi product pressed in a box, i.e., a boxed sushi product, a rod-shaped sushi product, a pressed sushi product and the like, and one sushi product may be packed and frozen or a plurality of sushi products may be packed and frozen together.

In the packed frozen sushi product of the present invention, the box and the packing bag are made of a microwave-transparent material, for example, a plastic box and a plastic packing bag or the like are used. In the present invention, the plastic box for containing the sushi product may have such a shape as in a generally used box, and its bottom has such a size that the sushi product formfittingly rest thereon when the sushi product is contained in the box, and its plane-, side-, front-, rear- and cross-sectional-shapes are so designed as to substantially conform the sushi product. With a view to rendering it easy to put in and to take out the sushi product, however, it is preferred that the plastic box for containing the sushi product be so formed as to have a top opening having a width and a length which are larger than those of the bottom, i.e., the top opening be so formed as to be broader than the bottom. If the top opening of the box is so formed as to be broader than the bottom as described above, it is rendered easy to put in and to take out the sushi product, and yet a space is advantageously formed around the sushi product. In the present invention, in a flexible packing bag which is made of a plastic film and microwave-safe, i.e., a flexible microwavable packing bag made of a plastic film, a space formed around the sushi product in a vacuumed condition advantageously provides interspaces between the sushi product and the box and between the box and the packing bag during thawing because volumetric change is slight due to the reduced pressure in the packing bag. In the present invention, in the vacuumed flexible microwavable packing bag made of a plastic film, the interspaces between the box and the sushi product and between the box and the packing bag, i.e., the space formed around the sushi product permits water vapor emanating at least from a shaped rice section of the frozen sushi product by heating of the frozen sushi product in thawing to circulate through the space. The space has a volume which enables appropriate steaming of the sushi product after the thawing. If the space has a large volume, the resulting product is bulky as a whole. In addition, a larger space formed around the sushi product in the packing bag undesirably results in a smaller steaming effect. On the other hand, a smaller space formed around the sushi product in the packing bag undesirably takes a longer time to effect approximately uniform steaming over the sushi product. In the present invention, a size of the space formed around the sushi product is 0.1 to 1, preferably 0.2 to 0.6, when the volume of the sushi product is supposed to be 1. In the present invention, the volume of the space formed around the sushi product in the vacuumed flexible microwavable packing bag made of a plastic film is that derived from subtracting the volume of the box and the volume of the sushi product from the volume of the interior of the vacuumed flexible microwavable packing bag made of a plastic film. In the present invention, since the shaped rice section and the sushi material or materials are placed in the bag made of a plastic film and hermetically vacuum-packed, when the shaped rice section and the sushi material or materials are once packed, these are optimally protected from entry of ambient air, moisture or bacteria.

In the present invention, thawing of the packed frozen sushi product is performed, for example, by microwave-heating by means of a microwave oven or the like. In this case, thawing of the shaped rice section of the sushi product is effected with heat generated by absorption of microwaves with which the shaped rice section is irradiated in the microwave oven. The thawing of the packed frozen sushi product may be effected with the opening of the box up or with the box upside down. In a case where the sushi material or materials may be heated, when the thawing is performed with the sushi material or materials up, the sushi material or materials and the shaped rice section can be heated together to bring temperatures of the sushi material or materials and the shaped rice section which are thawed by the microwave oven to substantially the same levels. In a case where the sushi material or materials are desired not to be heated by microwaves, when the thawing is performed with the sushi material or materials located under the shaped rice section, almost all microwaves in the microwave oven are applied to the shaped rice section to enable the sushi material or materials to have temperatures lower than those of the shaped rice section after the thawing. In the present invention, when the sushi material or materials are covered with the shaped rice section having a thickness of 1 cm or more, preferably 2 cm or more, temperatures of the shaped rice section and those of the sushi material or materials can be brought, respectively, to lukewarmths and to 10° C. to 25° C., preferably 15° C. to 20° C. According to purpose of the thawing of the packed frozen sushi product, the packed frozen sushi product may be thawed with the opening of the box up or with the box upside down.

In the present invention, if the sushi material or materials are desired not to be heated by microwaves, the thawing of the sushi material or materials is effected only with heat and water vapor which are emanating from the shaped rice section or sections of the sushi product or products. In this case, although the thawing of the packed frozen sushi product is dependent upon a weight and a storage temperature of the packed frozen sushi product, the thawing is performed, for example, as follows. The frozen packed sushi product is subjected to microwave-heating in a microwave oven for 2.5 minutes to 5 minutes to effect thawing of the frozen shaped rice section mainly, and then, without opening the packing bag, the resultant is allowed to stand, for example in a room, for a period of 15 minutes to 1 hour, preferably 15 to 45 minutes to steam the sushi material or materials with the water vapor emanating from the shaped rice section and to apply the heat of the shaped rice section to the sushi material or materials, whereby the thawing of the sushi material or materials is effected. In the present invention, in the course of the thawing, an inner surface of an upper portion of the packing bag and the sushi material or materials or the inner surface of the upper portion of the packing bag and the rice section which have been vacuum-packed and frozen in contact with each other become out of contact from each other, and water vapor permeates the resulting interspace to heat the rice section or the sushi material or materials of the sushi product.

In the present invention, the sushi product may be placed and thawed in a microwave oven with the sushi material or materials covered with the shaped rice section. In this case, most of microwaves with which the sushi product is irradiated are absorbed in the rice section covering the sushi material or materials, and on the other hand, the sushi material or materials covered with the rice section are shielded from the microwaves by the rice section and thereby heated to only a small extent. The sushi material or materials are heated with the microwaves only in the exposed portion thereof. In a case where a boxed sushi product or a rod-shaped sushi product is thawed by means of a microwave oven, a temperature distribution in the sushi product heated in the microwave oven is not uniform. In the shaped rice section of the sushi product, its exposed surfaces irradiated with microwaves have high temperatures, and portions located nearer to corners have higher temperatures because of concentration of microwave energy. According to the temperature distribution measured by the present inventors, it was found that exposed longitudinal ends of the sushi material or materials and shaped rice section of the sushi product have markedly higher temperatures as compared with those of surfaces of center portions of the shaped rice section and the sushi material or materials, and an interior portion of the sushi product, for example, a portion which is located at the center in the longitudinal direction and at which the sushi material or materials and the shaped rice section are in contact with each other has a considerably lower temperature as compared with those of the surfaces of the center portions of the shaped rice section and the sushi material or materials. In the case of a rod-shaped sushi product or a boxed sushi product, the rod-shaped sushi product or the boxed sushi heated by means of a microwave oven is cut into easy-to-eat sized pieces and then served. In this connection, the shaped rice section which has just been thawed has high temperatures, and in the shaped rice section having a temperature of, for example, 40° C. or higher, adhesion between rice grains thereof is strong. This results in difficulty in cutting pieces therefrom, and thus the sushi product is likely to undergo deformation during cutting and lose its original shape. It was found, however, that when the temperatures of the shaped rice section are allowed to lower to those of 15° C. to 30° C., preferably 15° C. to 25° C., the adhesion between the rice grains of the shaped rice section is thereby moderated to enable pieces to be cut from the sushi product with ease.

In the present invention, when the sushi product has been thawed by microwave-heating, to make use of residual heat in the rice and heat of water vapor for heating the sushi material or materials which remain cool, the resultant is allowed to stand without unpacking to steam the thawed sushi product with the water vapor generated in the packing bag, whereby temperatures of the sushi material or materials are raised and, in parallel therewith, temperatures of the shaped rice section are lowered. In the present invention, in the packing bag, a space is formed around the shaped rice section to permit water vapor generated in the thawing to freely flow therethrough, whereby steaming is efficiently effected. By virtue of this, in a relatively short period of time, the temperatures in the entire thawed shaped rice section can roughly be approximated to render the thawed packed sushi product easy to cut into pieces. When the packed frozen sushi product is thawed by means of a microwave oven, the packed frozen sushi product may be heated by the microwave oven for a relatively long period of time, for example, 2.5 minutes or longer, preferably 3.5 to 4.5 minutes to bring temperatures of the end faces of the shaped rice section to 30° C. or higher, for example, not lower than 40° C. or not lower than 50° C. at a time immediately after the thawing, and with the packing bag left hermetically sealed, allowed to stand for a predetermined period of time to steam the thawed packed sushi product, whereby the sushi product is rendered easy-to-cut to serve cut pieces. Further, the time for steaming may be reduced by cooling the sushi product which has been thawed by a microwave oven with water.

In the present invention, the sushi product contained in the box is placed in the packing bag together with the box, and the packing bag containing the sushi product in the box is vacuumed under reduced pressure of 600 mmHg or lower, preferably 400 mmHg or lower. When the packing bag is vacuumed, the bag collapses under atmospheric pressure, and the inner surface of the packing bag is brought in tight contact with the shaped rice section to enable the sushi product to be held fixedly in the box. In this manner, the packing bag is vacuumed, and the inner surface of an upper portion of the bag is thereby brought in tight contact with the sushi material or materials and the shaped rice section under atmospheric pressure, and the sushi material or materials and the shaped rice section are frozen in such a compactly held condition. Accordingly, the sushi material or materials undergo no dislocation during the thawing. Further, in the present invention, the space is formed around the sushi product. In the vacuuming process, however, air around the sushi product is removed, and heat transfer in the cooling is thereby promoted.

In the present invention, the box containing the sushi product may be prepared by topping the shaped rice section with the sushi material or materials in a sushi mold (kata) to make the sushi product, and placing the thus prepared sushi product in the box with the sushi material or materials up, or by topping the shaped rice section placed in the box with the sushi material or materials to make the sushi product in the box. In the present invention, however, the sushi product may be placed with the sushi material or materials down in the box. In the present invention, the box which contains the sushi product is placed in the flexible plastic packing bag, and the packing bag is vacuumed and hermetically sealed to bring the inner surface of the flexible plastic packing bag in tight contact with the sushi material or materials, whereby the sushi product are fixedly held in the box, and the vacuum-packed sushi product is brought in contact with a refrigerant cooled to a predetermined freezing temperature to freeze the contents including the sushi product in the packing bag together. Accordingly, the procedure to prepare the frozen packed sushi product may be performed almost mechanically with no substantial manual intervention and thus easily automatized to enable hygienic mass production. Accordingly, frozen packed sushi products of high quality can regularly be produced. Further, in the present invention, the sushi product is placed in the box, and the box containing the sushi product is placed in the packing bag with no covering thereon, and consequently, the narrow interspaces are formed between the box and the sushi product and between the box and the packing bag to permit water vapor emanating mainly from the shaped rice section as a result of microwave-heating by means of a microwave oven to flow through the thus formed interspaces, whereby heat is applied to the sushi material or materials still frozen to effect heating and thawing.

The packed frozen sushi product of the present invention comprises a vacuumed and hermetically sealed flexible microwavable plastic packing bag, an open-topped plastic box placed in the packing bag, and a sushi product placed in the box. In the packing bag, a space is formed around the sushi product, and an inner surface of the packing bag is in contact with an upper surface of the sushi product, and the packing bag, the box and the sushi product are frozen together in a unified form. Accordingly, when the packed frozen sushi product is thawed using a microwave oven without unpacking, the inside of the packing bag is filled with water vapor generated in the thawing. Subsequent to the thawing, steaming is effected by means of the water vapor generated in the thawing to successively heat the sushi product, thereby enabling the entire sushi product to have roughly approximated temperatures in a relatively short time. Further, in the present invention, only by vacuuming the packing bag, the sushi product can be frozen with the packing bag in contact with the upper surface of the sushi material or materials or the shaped rice section. Accordingly, the sushi product contained in the plastic box can be fixedly held in the box. As described above, in the present invention, the sushi product is frozen with the vacuumed packing bag in contact therewith. Accordingly, after placement of the sushi product in the plastic box, no substantial dislocations of the shaped rice section and the sushi material or materials are caused. By virtue of this, operating efficiency is improved, and increased product yield is realized. Moreover, in the present invention, the sushi product is placed in the plastic box, and the box containing the sushi product is placed in the plastic backing bag, and the resultant is frozen in a unified form. Accordingly, the space is formed around the sushi product. In particular, the interspaces are formed between the sushi product and the box and between the box and the packing bag. By circulation of water vapor generated in the thawing through the space, it is facilitated that the sushi product has roughly approximated temperatures after the steaming.

In the present invention, the sushi product is placed in the plastic box so as to stabilize the position thereof. In a case of a sushi product comprising a shaped rice section topped with a sushi material or materials, the sushi product may be placed in the plastic box with its sushi material or materials up or with its sushi material or materials down. When the sushi product is placed in the plastic box with its sushi material or materials down, in thawing by means of a microwave oven, its shaped rice section located over the sushi material or materials is irradiated with most of microwaves to enable temperatures of the sushi material or materials to be kept lower than those of the shaped rice section. In a case of a rolled sushi product, the sushi product may be placed in the box irrespective of location of its sushi material or materials. In this connection, if exposed ends of the sushi material or materials are covered with rice of 5 mm or more, preferably 10 mm or more in thickness, temperatures of the sushi material or materials can be kept lower than those of the shaped rice section. The plastic box containing the sushi product as described above, is placed in the flexible packing bag made of a plastic film to isolate from the surrounding environment. The packing bag which contains the box containing the sushi product is vacuumed and has its mouth sealed. The plastic packing bag having its mouth sealed as a whole cooled and frozen in a unified form by soaking it in a refrigerant such as a brine. In this manner, the packed frozen sushi product can be prepared relatively simply. Further, the packed frozen sushi product may be prepared relatively simply by placing a frozen sushi product which has been preliminarily frozen in the plastic box, placing the box containing the frozen sushi product in the flexible plastic packing bag, vacuuming the packing bag, and sealing a mouth of the vacuumed packing bag.

Embodiments of the present invention will be described hereinbelow with reference to the accompanying drawings. It should be noted, however, that the present invention is by no means restricted by the following description or Examples.

Figure 2:
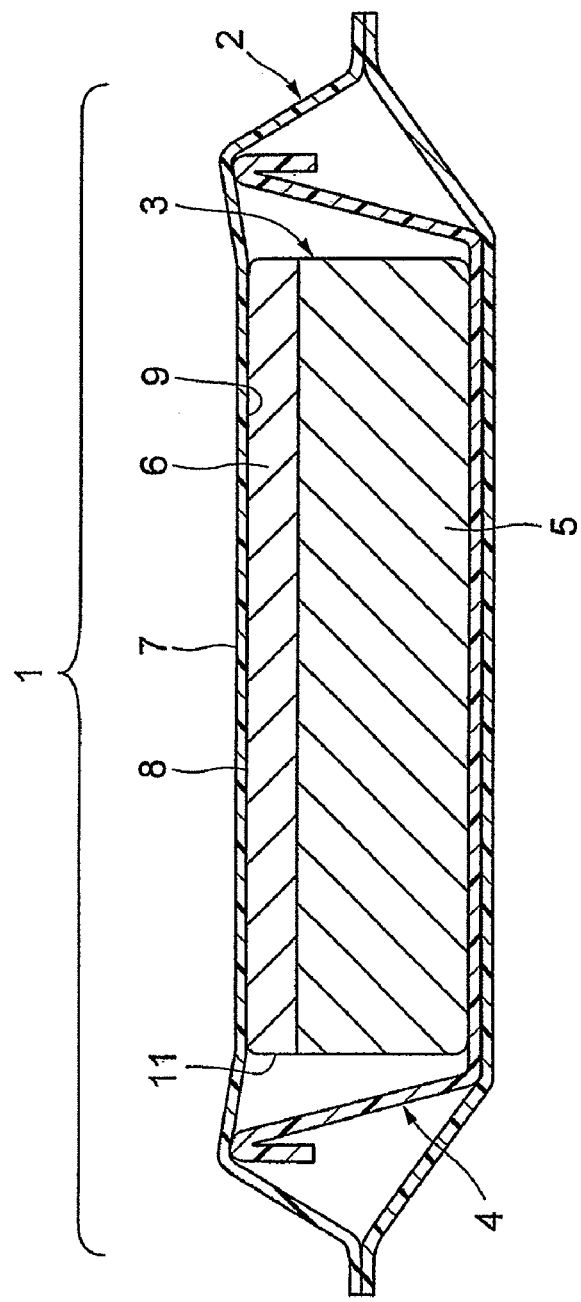
FIG. 2 is a schematic front sectional view schematically illustrating the Embodiment shown in FIG. 1.

FIG. 1 is a schematic side sectional view schematically illustrating one Embodiment of the present invention. FIG. 2 is a schematic front sectional view schematically illustrating Embodiment shown in FIG. 1. In FIGS. 1 and 2, the same reference numbers are used to designate corresponding elements.

Embodiment 1

In Embodiment shown in FIGS. 1 and 2, a packed frozen sushi product 1 has a microwave-transparent plastic packing bag 2 as an outer covering, and a microwave-transparent plastic box 4 containing a sushi product 3 is contained in the plastic packing bag 2, and in a condition where the plastic packing bag is vacuumed, the interior of the packed frozen sushi product 1 and contents including the sushi product 3 having a shaped rice section 5 and a sushi material or materials 6 are frozen together in a unified form. In the packed frozen sushi product 1, the plastic packing bag 2 is vacuumed and frozen in such a vacuumed condition that a center portion 7 of its top is depressed under atmospheric pressure, and an inner surface 9 of the center portion 7 is thereby in tight contact with an upper surface 8 of the sushi material or materials 6 of the sushi product 3. Accordingly, also in thawing, the upper surface 8 of the sushi material or materials 6 of the sushi product 3 is thawed in contact with the inner surface 9 of the center portion 7 of top of the plastic packing bag, and thus the shaped rice section 5 and the sushi material or materials 6 of the sushi product 3 in the box 4 undergo no substantial dislocations relative to pre-vacuuming positions thereof. In addition, since the interior of the packing bag is in the vacuumed condition, when water vapor is generated by microwave-heating for about 2.5 to 6 minutes, the packing bag 2 is not broken.

This Embodiment is constructed as described above, and thus the packed frozen sushi product 1 may be prepared, for example, as follows. A shaped rice section 5 is topped with a sushi material or materials 6 to prepare a sushi product 3, and the prepared sushi product 3 is placed in a plastic box 4. The box 4 containing the sushi product 3 is placed in a packing bag 2, and a mouth 10 of the packing bag 2 is connected to a suction port of a vacuum pump (neither of them is shown), and the packing bag 2 is vacuumed under a pressure of, for example, 400 mmHg. In the vacuuming step, a top portion 7 of the packing bag 2 is depressed under atmospheric pressure to press an upper surface 8 of the sushi material or materials 6, thereby stabilizing positions of the sushi product and the sushi material or materials in the box 4. After completion of the vacuuming, the mouth 10 of the packing bag 2 is heat-sealed to hermetically seal the packing bag. The hermetically sealed plastic packing bag 2 is soaked in an ethanol brine refrigerant to freeze the plastic packing bag as a whole in a unified form, whereby the packed frozen sushi product 1 is prepared. The packed frozen sushi products 1 thus prepared are cold-stored in an insulated storage at a low temperature of, for example, −25° C. or lower, and appropriately, they are taken out and thawed and served as sushi.

In this Embodiment, the packed frozen sushi product 1 may be thawed in a microwave oven with its sushi material or materials 6 up. Alternatively, the packed frozen sushi product may be thawed with the shaped rice section 5 up and the sushi material or materials 6 down, i.e., with the plastic box 4 turned upside down. When thawing is performed in a microwave oven with the sushi material 8 up, the sushi product is one whose sushi material or materials 6 may be heated. Microwaves are emitted toward the sushi product 3 in the vertical direction and lateral directions to heat the upper surface 8, the front and rear end surfaces 11 and the side surfaces 12 of the sushi material or materials 6 which are exposed surfaces of the sushi material or materials. In exposed portions, the shaped rice section 5 and the sushi material or materials 6 are heated to substantially the same degree immediately after thawing of the sushi product 3. The microwaves emitted toward the sushi product 3 are absorbed solely through the exposed portions of the shaped rice section 5 and the sushi material or materials 6 to heat the shaped rice section 5 and the sushi material or materials 6. From the shaped rice section 5 heated in this manner, water vapor is generated as the temperature of the shaped rice section increases. The flexible plastic packing bag 2 is filled with the generated water vapor to heat the shaped rice section 5 and the sushi material or materials 6. Consequently, the sushi product 3 is so thawed as to have substantially uniform temperature throughout the sushi product. In the following, specific Examples of this Embodiment will be given.

Example 1

1400 ml of seasoned vinegar (sushi vinegar) was added in 13 kg of cooked rice, followed by mixing to uniformly vinegar and the rice. Then, the rice thus seasoned with vinegar was cooled to 50° C. to prepare vinegar-seasoned rice, i.e., vinegared rice. To the prepared vinegared rice, minced shiitake mushrooms which had been reconstituted with water and then cooked in a broth seasoned with sugar, soy sauce and sweet cooking sake' (mirin) and minced gourd shavings (kampyo) which had been reconstituted with water and then cooked in a broth seasoned with sugar, soy sauce and sweet cooking sake' (mirin) were added, followed by mixing to prepare sushi rice. On the other hand, belly-slit conger eels (anago) were cooked in a broth seasoned with sugar, soy sauce and sweet cooking sake' and cut into strips of 5.5 cm in width and 18 cm in length to make conger eel fillet preparations as a sushi material.

Using 240 g of the sushi rice and 50 g of a conger eel fillet preparation as a sushi material, each of conger eel-topped boxed sushi products of 5.5 cm in width, 18 cm in length and 3 cm in thickness (L size) was prepared using a box-shaped sushi mold (hako-gata). The conger eel-topped boxed sushi product (L size) was removed from the sushi mold and placed in a plastic box with its conger eel fillet preparation as a sushi material down. The box had inner dimensions of 6.0 cm in width and 19.2 cm in length at its bottom, and 7.0 cm in width and 20.5 cm in length at its top opening, and 3.0 cm in depth. The box which contained the sushi product was placed in a flexible packing bag made of a laminated film composed of a polyethylene film as an inner layer and a nylon film as an outer layer, and the packing bag was vacuumed by a vacuum pump under a pressure of 40 cmHg and had its mouth heat-sealed. In the vacuumed packing bag, its top portion was depressed and in tight contact with the shaped rice section.

The packing bag, in which the conger eel-topped boxed sushi product had been placed together with the plastic box containing the same and which had been vacuumed and heat-sealed, was kept in ethyl alcohol having a temperature of −35° C. as a brine for 45 minutes and thereby brine-frozen to obtain a packed frozen conger eel-topped sushi product (L size). In the packed frozen conger eel-topped sushi product (L size), the plastic packing bag as an outer covering, the plastic box and the conger eel-topped sushi product as contents were frozen together in a unified form. The packed frozen conger eel-topped sushi products (L size) were stored at −23.3° C. on average.

In cooking the packed frozen conger eel-topped sushi product (L size), a 500 W microwave oven was used.

The packed frozen conger eel-topped sushi product (L size) in this Example was placed in the 500 W microwave oven and thawed by applying heat for 4 minutes. 4 minutes, which was the same as the time of thawing by the microwave oven, after completion of the thawing, the thawed packed sushi product was removed from the microwave oven and allowed to stand at room temperature for 45 minutes to effect steaming. In this Example, with respect to the microwave-exposed rice section of the thawed sushi product, temperatures of "an upper corner portion of the shaped rice section where three edges meet together" (in Table 1, referred to as "corner portion of the end of the upper surface of the rice section"), temperatures of "a portion of the upper surface of the shaped rice section which was located 1 cm inner from the longitudinal end and at the center in the width direction" (in Table 1, referred to as "portion of the upper surface of an end portion of the rice section") and temperatures of "a portion of the upper surface of the shaped rice section which is located at the center in the width direction and in the longitudinal direction" (in Table 1, referred to as "center portion of the upper surface of the rice section") were measured immediately after the thawing, after a lapse of 30 minutes in the steaming, and after a lapse of 40 minutes for the steaming. Also, with respect to the sushi material of the thawed sushi product, temperatures of "a portion 1cm inner from the longitudinal end of the box-side surface of the sushi material" (in Table 1, referred to as "end portion of the box-side of the sushi material"), temperatures of "a center portion of the box-side surface of the sushi material" (in Table 1, referred to as "center portion of the box-side surface of the sushi material"), temperatures of "a portion 1 cm inner from the longitudinal end of the vinegared rice-side surface of the sushi material" (in Table 1, referred to as "end portion of the rice-side surface of the sushi material") and temperatures of "a center portion of the vinegared rice-side of the sushi material" (in Table 1, referred to as "center portion of the rice-side surface of the sushi material") were measured immediately after the thawing, after a lapse of 30 minutes in the steaming, and after a lapse of 45 minutes for the steaming. The results are shown in Table 1.

TABLE 1

| | Temp. ° C. immediately after thawing | post-30 minutes-steaming | post-45 minutes-steaming |
|---|---|---|---|
| Corner portion of the end of the upper surface of the rice section | 68.4 | 29.6 | 29.9 |
| Portion of side surface of an end portion of the rice section | 47.6 | 29.6 | 30.7 |
| Center portion of the upper surface of the rice section | 3.6 | 8.1 | 19.0 |
| End portion of the box-side surface of the sushi material | 47.1 | 29.9 | 31.0 |
| Center portion of the box-side surface of the sushi material | 28.3 | 13.7 | 18.8 |
| End portion of the rice-side surface of the sushi material | 52.6 | 25.8 | 30.2 |
| Center portion of the rice-side surface of the sushi material | 19.9 | 12.8 | 17.5 |

In the boxed sushi product, immediately after the thawing, there were differences of about 44° C. to 65° C. between the center portion in the longitudinal direction and the longitudinal end portions. When the sushi product was steamed for 45 minutes, however, the shaped rice section and the sushi material had a substantially uniform temperature distribution except the end portions, and temperatures exceeded 15° C. throughout the sushi product, and temperature differences were within a desired range of 15 to 30° C., and the boxed sushi product was easily cut with a kitchen knife.

Example 2

Using 240 g of sushi rice and 50 g of a conger eel fillet preparation as a sushi material, each of conger eel-topped boxed sushi products of 5.5 cm in width, 18 cm in length and 3 cm in thickness (L size) was prepared using a box-shaped sushi mold (hako-gata). The sushi rice was prepared, in the same manner as in Example 1, by mixing minced shiitake mushrooms and minced gourd shavings (kampyo) each of which had been reconstituted with water and then cooked in a broth seasoned with sugar, soy sauce and sweet cooking sake' (mirin) with rice vinegared and cooled to 50° C. The conger eel fillet preparation was prepared, in the same manner as in Example 1, by cooking in a broth seasoned with sugar, soy sauce and sweet cooking sake'. The conger eel-topped boxed sushi product (L size) was removed from the sushi mold and placed in a plastic box with its conger eel fillet preparation as a sushi material down. The box had the same inner dimensions as in Example 1, i.e., those of 6.0 cm in width and 19.2 cm in length at its bottom, and 7.0 cm in width and 20.5 cm in length at its top opening, and 3.0 cm in depth. The box which contained the sushi product was placed in a flexible packing bag made of a laminated film composed of a polyethylene film as an inner layer and a nylon film as an outer layer, and the packing bag was vacuumed by a vacuum pump under a pressure of 40 cmHg and had its mouth heat-sealed. In the vacuumed packing bag, its top portion was depressed and in tight contact with the shaped rice section.

The packing bag, in which the conger eel-topped boxed sushi product had been placed together with the plastic box containing the same and which had been vacuumed and heat-sealed, was kept in ethyl alcohol having a temperature of −35° C. as a brine for 45 minutes and thereby brine-frozen to obtain a packed frozen conger eel-topped sushi product (L size). In the packed frozen conger eel-topped sushi product (L size), the plastic packing bag as an outer covering, the plastic box and the conger eel-topped sushi product as contents were frozen together in a unified form. The packed frozen conger eel-topped sushi products (L size) were stored at −23.6° C. on average.

In cooking the packed frozen conger eel-topped sushi product (L size), a 500 W microwave oven was used.

The packed frozen conger eel-topped sushi product (L size) in this Example was placed in the 500 W microwave oven and thawed by applying heat for 3 minutes and 20 seconds. 3 minutes and 20 seconds, which was the same as the time of thawing by the microwave oven, after completion of the thawing, the thawed packed sushi product was removed from the microwave oven and allowed to stand at room temperature for 45 minutes to effect steaming. In this Example, with respect to the microwave-exposed rice section of the thawed sushi product, temperatures of "an upper corner portion of the shaped rice section where three edges meet together" (in Table 2, referred to as Corner portion of the end of the upper surface of the rice section), temperatures of "a portion of the side surface of the shaped rice section which was located 1 cm inner from the longitudinal end and at the center in the width direction" (in Table 2, referred to as Portion of side surface of an end portion of the rice section) and temperatures of "a portion of the upper surface of the shaped rice section which is located at the center in the width direction and in the longitudinal direction" (in Table 2, referred to as Center portion of the upper surface of the rice section) were measured immediately after the thawing, after a lapse of 30 minutes in the steaming, and after a lapse of 45 minutes for the steaming. Also, with respect to the sushi material of the thawed sushi product, temperatures of "a portion 1 cm inner from the longitudinal end of the box-side surface of the sushi material" (in Table 2, referred to as End portion of the box-side surface of the sushi material), and temperatures of "a portion 1 cm inner from the longitudinal end of the vinegared rice-side surface of the sushi material" (in Table 2, referred to as End portion of the rice-side surface of the sushi material) were measured immediately after the thawing, after a lapse of 30 minutes in the steaming, and after a lapse of 45 minutes for the steaming. The results are shown in Table 2.

TABLE 2

| | Temp. ° C. immediately after thawing | post-30 minutes-steaming | post-45 minutes-steaming |
|---|---|---|---|
| Corner portion of the end of the upper surface of the rice section | 62.9 | 20.9 | 26.9 |
| Portion of side surface of an end portion of the rice section | 42.4 | 20.7 | 26.4 |
| Center portion of the upper surface of the rice section | 2.2 | 5.8 | 13.1 |
| End portion of the box-side surface of the sushi material | 42.6 | 25.2 | 26.0 |
| End portion of the rice-side surface of the sushi material | 44.2 | 25.6 | 26.1 |

In the boxed sushi product, immediately after the thawing, there were differences of about 40° C. to 60° C. between the center portion in the longitudinal direction of the rice section and the longitudinal end portions of the rice section. When the sushi product was steamed for 45 minutes, however, the shaped rice section and the sushi material had a substantially uniform temperature distribution except the end portions, and temperatures exceeded 15° C. throughout the sushi product, and temperature differences were within a range of about 15° C. or less, and the boxed sushi product was easily cut with a kitchen knife.

Example 3

Using 180 g of sushi rice and 40 g of a conger eel fillet preparation as a sushi material, each of conger eel-topped boxed sushi products of 5.5 cm in width, 14 cm in length and 3 cm in thickness (S size) was prepared using a box-shaped sushi mold (hako-gata). The sushi rice was prepared, in the same manner as in Example 1, by mixing minced shiitake mushrooms and minced gourd shavings (kampyo) each of which had been reconstituted with water and then cooked in a broth seasoned with sugar, soy sauce and sweet cooking sake' (mirin) with rice vinegared and cooled to 50° C. The conger eel fillet preparation was prepared, in the same manner as in Example 1, by cooking in a broth seasoned with sugar, soy sauce and sweet cooking sake'. The conger eel-topped boxed sushi product (L size) was removed from the sushi mold and placed in a plastic box with its conger eel fillet preparation as a sushi material down. The box had the same inner dimensions as in Example 1, i.e., those of 6.5 cm in width and 14.0 cm in length at its bottom, and 7.2 cm in width and 15.7 cm in length at its top opening, and 3.3 cm in depth. The box which contained the sushi product was placed in a flexible packing bag made of a laminated film composed of a polyethylene film as an inner layer and a nylon film as an outer layer, and the packing bag was vacuumed by a vacuum pump under a pressure of 40 cmHg and had its mouth heat-sealed. In the vacuumed packing bag, its top portion was depressed and in tight contact with the shaped rice section.

The packing bag, in which the conger eel-topped boxed sushi product had been placed together with the plastic box containing the same and which had been vacuumed and heat-sealed, was kept in ethyl alcohol having a temperature of −35° C. as a brine for 45 minutes and thereby brine-frozen to obtain a packed frozen conger eel-topped sushi product (S size). In the packed frozen conger eel-topped sushi product (S size), the plastic packing bag as an outer covering, the plastic box and the conger eel-topped sushi product as contents were frozen together in a unified form. The packed frozen conger eel-topped sushi products (S size) were stored at −18.4° C. on average.

In cooking the packed frozen conger eel-topped sushi product (S size), a 500 W microwave oven was used.

The packed frozen conger eel-topped sushi product (S size) in this Example was placed in the 500 W microwave oven and thawed by applying heat for 2.5 minutes. 2.5 minutes, which was the same as the time of thawing by the microwave oven, after completion of the thawing, the thawed packed sushi product was removed from the microwave oven and allowed to stand at room temperature for 45 minutes to effect steaming. In this Example, with respect to the microwave-exposed rice section of the thawed sushi product, temperatures of "a portion of the side surface of the shaped rice section which was located 1 cm inner from the longitudinal end and at the center in the width direction" (in Table 3, referred to as Portion of side surface of an end portion of the rice section) and temperatures of "a portion of the upper surface of the shaped rice section which is located at the center in the width direction and in the longitudinal direction" (in Table 3, referred to as Center portion of the upper surface of the rice section) were measured immediately after the thawing, after a lapse of 30 minutes in the steaming, and after a lapse of 45 minutes for the steaming. Also, with respect to the sushi material of the thawed sushi product, temperatures of "a portion 1 cm inner from the longitudinal end of the box-side surface of the sushi material" (in Table 3, referred to as End portion of the box-side surface of the sushi material), and temperatures of "a portion 1 cm inner from the longitudinal end of the vinegared rice-side surface of the sushi material" (in Table 2, referred to as End portion of the rice-side surface of the sushi material) were measured immediately after the thawing, after a lapse of 30 minutes in the steaming, and after a lapse of 45 minutes for the steaming. The results are shown in Table 3.

TABLE 3

| | Temp. ° C. immediately after thawing | post-30 minutes-steaming | post-45 minutes-steaming |
|---|---|---|---|
| Portion of side surface of an end portion of the rice section | 43.0 | 24.5 | 23.4 |
| Center portion of the upper surface of the rice section | 5.0 | 14.3 | 17.1 |
| End portion of the box-side surface of the sushi material | 30.5 | 21.3 | 20.5 |
| End portion of the rice-side surface of the sushi material | 26.6 | 22.9 | 21.3 |

In the boxed sushi product, immediately after the thawing, there was a difference of about 38° C. between the center portion in the longitudinal direction of the rice section and the longitudinal end portion of the rice section. When the sushi product was steamed for 30 minutes, however, temperatures of the shaped rice section and the sushi material exceeded 14° C. throughout the sushi product, and temperature differences were within a range of about 10° C. or less. When the sushi product was steamed for 45 minutes, the shaped rice section and the sushi material had a substantially uniform temperature distribution except the end portions, and temperatures were 15° C. or higher throughout the sushi product, and temperature differences were within a range of about 6° C. or less. In the both post-steaming cases, the boxed sushi product was easily cut with a kitchen knife.

Example 4

Using 240 g of sushi rice and 50 g of a conger eel fillet preparation as a sushi material, each of conger eel-topped boxed sushi products of 5.5 cm in width, 18 cm in length and 3 cm in thickness (L size) was prepared using a box-shaped sushi mold (hako-gata). The sushi rice was prepared, in the same manner as in Example 1, by mixing minced shiitake mushrooms and minced gourd shavings (kampyo) each of which had been reconstituted with water and then cooked in a broth seasoned with sugar, soy sauce and sweet cooking sake' (mirin) with rice vinegared and cooled to 50° C. The conger eel fillet preparation was prepared, in the same manner as in Example 1, by cooking in a broth seasoned with sugar, soy sauce and sweet cooking sake'. The conger eel-topped boxed sushi product (L size) was removed from the sushi mold and placed in a plastic box with its conger eel fillet preparation as a sushi material up. The box had inner dimensions of 6.0 cm in width and 19.2 cm in length at its bottom, and 7.0 cm in width and 20.5 cm in length at its top opening, and 3.3 cm in depth. The box which contained the sushi product was placed in a flexible packing bag made of a laminated film composed of a polyethylene film as an inner layer and a nylon film as an outer layer, and the packing bag was vacuumed by a vacuum pump under a pressure of 40 cmHg and had its mouth heat-sealed. In the vacuumed packing bag, its top portion was depressed and in tight contact with the shaped rice section.

The packing bag, in which the conger eel-topped boxed sushi product had been placed together with the plastic box containing the same and which had been vacuumed and heat-sealed, was kept in ethyl alcohol having a temperature of −35°

C. as a brine for 45 minutes and thereby brine-frozen to obtain a packed frozen conger eel-topped sushi product (L size). In the packed frozen conger eel-topped sushi product (L size), the plastic packing bag as an outer covering, the plastic box and the conger eel-topped sushi product as contents were frozen together in a unified form. The packed frozen conger eel-topped sushi products (L size) were stored at −18.0° C. on average.

In cooking the packed frozen conger eel-topped sushi product (L size), a 500 W microwave oven was used.

The packed frozen conger eel-topped sushi product (L size) in this Example was placed in the 500 W microwave oven and thawed by applying heat for 4 minutes and 15 seconds. 4 minutes and 15 seconds, which was the same as the time of thawing by the microwave oven, after completion of the thawing, the thawed packed sushi product was removed from the microwave oven and allowed to stand at room temperature for 45 minutes to effect steaming. In this Example, with respect to the microwave-exposed rice section of the thawed sushi product, temperatures of "a portion of the side surface of the longitudinal end of the shaped rice section" (in Table 4, referred to as End side portion of the rice section) and temperatures of "a portion of the lower surface of the shaped rice section which is located at the center in the width direction and in the longitudinal direction" (in Table 4, referred to as Center portion of the lower surface of the rice section) were measured immediately after the thawing, after a lapse of 30 minutes in the steaming, and after a lapse of 45 minutes for the steaming. Also, with respect to the sushi material of the thawed sushi product, temperatures of "a portion 1 cm inner from the longitudinal end of the upper side of the sushi material" (in Table 4, referred to as End side portion of the upper side of the sushi material), and temperatures of "a portion 1 cm inner from the longitudinal end side of the rice-side, i.e., the lower side of the sushi material" (in Table 4, referred to as End side portion of the rice-side of the sushi material) were measured immediately after the thawing, after a lapse of 20 minutes in the steaming, and after a lapse of 30 minutes for the steaming. The results are shown in Table 4.

TABLE 4

|  | Temp. ° C. immediately after thawing | post-20 minutes-steaming | post-30 minutes-steaming |
|---|---|---|---|
| End side portion of the rice section | 58.2 | 30.6 | 29.1 |
| Center portion of the lower surface of the rice section | 27.8 | 26.1 | 25.6 |
| End side portion of the upper side of the sushi material | 23.4 | 24.5 | 26.2 |
| End side portion of the rice-side of the sushi material | 18.6 | 21.7 | 23.3 |

In the boxed sushi product, immediately after the thawing, there was a difference of about 30° C. between the center portion in the longitudinal direction of the rice section and the longitudinal end portion of the rice section. When the sushi product was steamed for 20 or 30 minutes, however, the shaped rice section and the sushi material had a substantially uniform temperature distribution except the end portions, and temperatures exceeded 20° C. throughout the sushi product, and temperature differences were within a range of about 10° C. or less, and the boxed sushi product was easily cut with a kitchen knife.

Example 5

1400 ml of seasoned vinegar (sushi vinegar) was added in 13 kg of cooked rice, followed by mixing to uniformly vinegar the rice. Then, the rice thus seasoned with vinegar was cooled to 50° C. to prepare vinegar-seasoned rice, i.e. vinegared rice. 210 g of the prepared vinegared rice was spread out and 40 g of core was placed on top of the spread out vinegared rice to obtain each of round bar shaped thick-rolled sushi products of 5 cm in diameter and 14.5 cm in length (S size) using a sushi rolling machine for thick-rolled sushi or the like. In this Example, the following ingredients were used as the core; 1) finely chopped shiitake mushrooms which had been reconstituted with water and then cooked in a broth seasoned with sugar, soy sauce and sweet cooking sake' (mirin); 2) finely chopped gourd shavings (kampyo) which had been reconstituted with water and then cooked in a broth seasoned with sugar, soy sauce and sweet cooking sake' (mirin); 3) Egg seasoned with stock and seasonings such as sugar and soy sauce and cooked into box-shaped Japanese thick omelet, which was then cut into a stick-shape with 1 cm width, 1 cm height and 14.5 cm length; and 4) Boiled Japanese mitsuba herb cut to appropriate length.

The thick-rolled sushi product (S size) thus prepared was placed in a plastic box. The box had inner dimensions of 6.5 cm in width and 14.0 cm in length at its bottom, and 7.2 cm in width and 15.7 cm in length at its top opening, and 3.3 cm in depth. The box which contained the sushi product was placed in a flexible packing bag made of a laminated film composed of a polyethylene film as an inner layer and a nylon film as an outer layer, and the packing bag was vacuumed by a vacuum pump under a pressure of 40 cmHg and had its mouth heat-sealed. In the vacuumed packing bag, its top portion was depressed and in tight contact with the top surface of the thick-rolled sushi product.

The packing bag, in which the thick-rolled sushi product had been placed together with the plastic box containing the same and which had been vacuumed and heat-sealed, was kept in ethyl alcohol having a temperature of −35° C. as a brine for 45 minutes and thereby brine-frozen to obtain a packed frozen thick-rolled sushi product (S size). In the packed frozen thick-rolled sushi product (S size), the plastic packing bag as an outer covering, the plastic box and the thick-rolled sushi product as contents were frozen together in a unified form. The packed frozen thick-rolled sushi products (S size) were stored at −24.3° C. on average.

In cooking the packed frozen thick-rolled sushi product (S size), a 500 W microwave oven was used.

The packed frozen thick-rolled sushi product (S size) in this Example was placed in the 500 W microwave oven and thawed by applying heat for 3 minutes and 20 seconds. 3 minutes and 20 seconds, which was the same as the time of thawing by the microwave oven, after completion of the thawing, the thawed packed sushi product was removed from the microwave oven and allowed to stand at room temperature for 45 minutes to effect steaming. In this Example, with respect to the microwave-exposed rice portion of the thawed thick-rolled sushi product, temperatures of "a portion located 1 cm inner from the longitudinal end" (in Table 5, referred to as Portion of side surface of an end portion of the rice section), temperatures of "a portion of the surface at the center in the longitudinal direction" (in Table 5, referred to as Center portion of the upper surface of the rice section) and temperatures of "a portion located 2mm in depth from the surface at the center in the longitudinal direction" (in Table 5, referred to as Center portion inside the rice section) were measured immediately after the thawing, after a lapse of 30 minutes in the steaming, and after a lapse of 45 minutes for the steaming. Also, with respect to the sushi material of the thawed thick-rolled sushi product, temperatures of "a portion located 25 mm in depth from the surface at the center in the longitudinal direction" (in Table 5, referred to as The sushi materials section) were measured immediately after the thawing, after a lapse of 30 minutes in the steaming, and after a lapse of 45 minutes for the steaming. The results are shown in Table 5.

TABLE 5

|  | Temp. ° C. immediately after thawing | post-30 minutes-steaming | post-45 minutes-steaming |
| --- | --- | --- | --- |
| Portion of side surface of an end portion of the rice section | 57.3 | 27.7 | 26.9 |
| Center portion of the upper surface of the rice section | 11.4 | 20.3 | 18.9 |
| Center portion inside the rice section | 5.5 | 19.9 | 18.0 |
| The sushi materials section | −2.5 | 20.0 | 18.0 |

In the thick-rolled sushi product, immediately after thawing, there were differences of about 45° C. between the center portion in the longitudinal direction and the longitudinal end portions of the shaped rice portion. 30 minutes and 45 minute after leaving the sushi product to steam, the temperatures of the shaped rice section and the sushi material were both generally 20° C. or more, although with some differences, and the overall temperature difference was within about 10° C. or less. When the sushi product was steamed for 45 minutes, temperatures of the shaped rice portion and the sushi material were within a temperature range of about 15 to 30° C. throughout the sushi product, enabling the thawed thick-roll sushi product to be cut easily with a kitchen knife.

Example 6

In the same manner as in Example 5, vinegared rice and core were prepared. 265 g of the prepared vinegared rice was spread out and 50 g of the core was placed on top of the spread out vinegared rice to prepare each of round bar shaped thick-rolled sushi products of 5 cm in diameter and 18 cm in length (L size) using a sushi rolling machine for thick-rolled sushi or the like. The thick-rolled sushi product (L size) thus prepared was placed in a plastic box. The box had inner dimensions of 6.0 cm in width and 19.2 cm in length at its bottom, and 7.2 cm in width and 20.5 cm in length at its top opening, and 3.3 cm in depth. The box which contained the sushi product was placed in a flexible packing bag made of a laminated film composed of a polyethylene film as an inner layer and a nylon film as an outer layer, and the packing bag was vacuumed by a vacuum pump under a pressure of 40 cmHg and had its mouth heat-sealed. In the vacuumed packing bag, its top portion was depressed and in tight contact with the top surface of the thick-rolled sushi product.

The packing bag, in which the thick-rolled sushi product had been placed together with the plastic box containing the same and which had been vacuumed and heat-sealed, was kept in ethyl alcohol having a temperature of −35° C. as a brine for 45 minutes and thereby brine-frozen to obtain a packed frozen thick-rolled sushi product (L size). In the packed frozen thick-rolled sushi product (L size), the plastic packing bag as an outer covering, the plastic box and the thick-rolled sushi product as contents were frozen together in a unified form. The packed frozen thick-rolled sushi products (L size) were stored at −19.5° C. on average.

In cooking the packed frozen thick-rolled sushi product (L size), a 500 W microwave oven was used.

The packed frozen thick-rolled sushi product (L size) in this Example was placed in the 500 W microwave oven and thawed by applying heat for 3 minutes and 20 seconds. 3 minutes and 20 seconds, which was the same as the time of thawing by the microwave oven, after completion of the thawing, the thawed packed sushi product was removed from the microwave oven and allowed to stand at room temperature for 45 minutes to effect steaming. In this Example, with respect to the microwave-exposed rice portion of the thawed thick-rolled sushi product, temperatures of "a portion located 1 cm inner from the longitudinal end" (in Table 5, referred to as Portion of side surface of an end portion of the rice section), temperatures of "a portion of the surface at the center in the longitudinal direction" (in Table 5, referred to as Center portion of the upper surface of the rice section) and temperatures of "a portion located 2 mm in depth from the surface at the center in the longitudinal direction" (in Table 5, referred to as Center portion inside the rice section) were measured immediately after the thawing, after a lapse of 30 minutes in the steaming, and after a lapse of 45 minutes for the steaming. Also, with respect to the sushi material of the thawed thick-rolled sushi product, temperatures of "a portion located 25 mm in depth from the surface at the center in the longitudinal direction" (in Table 5, referred to as The sushi materials section) were measured immediately after the thawing, after a lapse of 30 minutes in the steaming, and after a lapse of 45 minutes for the steaming. The results are shown in Table 6.

TABLE 6

|  | Temp. ° C. immediately after thawing | post-30 minutes-steaming | post-45 minutes-steaming |
| --- | --- | --- | --- |
| Portion of side surface of an end portion of the rice section | 65.2 | 25.9 | 23.3 |
| Center portion of the upper surface of the rice section | 12.2 | 13.0 | 15.3 |
| Center portion inside the rice section | 10.6 | 12.2 | 13.4 |
| The sushi materials section | 3.0 | 3.7 | 11.1 |

In the thick-rolled sushi product, immediately after thawing, there were differences of about 53° C. between the center portion in the longitudinal direction and the longitudinal end portions of the shaped rice portion. 45 minutes after leaving the sushi product to steam, the temperatures of the shaped rice section and the sushi material exceeded 10° C., and the overall temperature difference was within a range of about 10° C. or less, enabling the thawed thick-roll sushi product to be cut easily with a kitchen knife.

Example 7

1400 ml of seasoned vinegar (sushi vinegar) was added in 13 kg of cooked rice, followed by mixing to uniformly vinegar the rice. Then, the rice thus seasoned with vinegar was cooled to 50° C. to prepare vinegar-seasoned rice, i.e., vinegared rice. On the other hand, back or belly-slit eels were grilled while being repeatedly coated with a thick sauce (tare) prepared from seasoning including soy sauce, sugar and sweet cooking sake' (mirin) to prepare grilled eel fillets (kabayaki), and the grilled eel fillets were cut into pieces having dimensions of 4 cm in width, 6 cm in length and 3 mm in thickness and a weight of approximately log per piece as sushi material pieces. 180 g of vinegared rice was placed in a box-shaped sushi mold with dimensions of 5.5 cm in width, 14 cm in length and 3 cm in depth for pressed sushi making, and 4 pieces (40 g) of the grilled eel as a sushi material were placed on top of the vinegared rice to produce each of eel-topped boxed sushi products (S size). The eel-topped boxed sushi product of 5.5 cm in width, 14 cm in length and 3.3 cm in thickness (S size) was removed from the box-shaped sushi mold and placed in a plastic box with its pieces of eel as a sushi material down. The box had inner dimensions of 6.5 cm in width and 14.0 cm in length at its bottom, and 7.2 cm in width and 15.7 cm in length at its top opening, and 3.3 cm in depth. The box which contained the sushi product was placed in a flexible packing bag made of a laminated film composed of a polyethylene film as an inner layer and a nylon film as an outer layer, and the packing bag was vacuumed by a vacuum pump under a pressure of 40 cmHg and had its mouth heat-sealed. In the vacuumed packing bag, its top portion was depressed and in tight contact with the shaped rice section.

The packing bag, in which the eel-topped boxed sushi product had been placed together with the plastic box containing the same and which had been vacuumed and heat sealed, was kept in ethyl alcohol having a temperature of −35° C. as a brine for 45 minutes and thereby brine-frozen to obtain a packed frozen eel-topped sushi product (S size). In the packed frozen eel-topped sushi product (S size), the plastic packing bag as an outer covering, the plastic box and the eel-topped sushi product as contents were frozen together in a unified form. The packed frozen eel-topped sushi products (S size) were stored at −21.6° C. on average.

In cooking the packed frozen eel-topped sushi product (S size), a 500 W microwave oven was used.

The packed frozen eel-topped sushi product (S size) in this Example was placed in the 500 W microwave oven and thawed by applying heat for 2.5 minutes. 2.5 minutes, which was the same as the time of thawing by the microwave oven, after completion of the thawing, the thawed packed sushi product was removed from the microwave oven and allowed to stand at room temperature for 45 minutes to effect steaming. In this Example, with respect to the microwave-exposed rice portion of the thawed sushi product, temperatures of "a portion of the side surface of the shaped rice section which was located on the longitudinal end" (in Table 7, referred to as Portion of side surface of an end portion of the rice section) and the temperatures of "a portion of the upper surface of the shaped rice section (in the box) which is located at the center in the width direction and in the longitudinal direction" (in Table 7, referred to Center portion of the upper surface of the rice section) were measured immediately after the thawing, after a lapse of 30 minutes in the steaming, and after a lapse of 45 minutes for the steaming. Also, with respect to the sushi material of the thawed sushi product, temperatures of "a portion 1 cm inner from the longitudinal end of the lower surface (on the bottom of the box), i.e., box-side surface of the sushi material" (in Table 7, referred to as Surface of the lower side end portion of the sushi material) and temperatures of "a portion 1 cm inner from the longitudinal end of the vinegared rice-side surface of the sushi material" (in Table 7, referred to as End portion of the vinegared rice-side surface of the sushi material) were measured immediately after the thawing, after a lapse of 20 minutes in the steaming, and after a lapse od 30 minutes for the steaming. The results are shown in Table 7.

TABLE 7

|  | Temp. ° C. immediately after thawing | post-30 minutes- steaming | post-45 minutes- steaming |
| --- | --- | --- | --- |
| Portion of side surface of an end portion of the rice section | 57.0 | 25.7 | 23.7 |
| Center portion of the upper surface of the rice section | 8.2 | 19.4 | 20.2 |
| Surface of the lower side end portion of the sushi material | 16.7 | 20.3 | 20.6 |

TABLE 7-continued

|  | Temp. ° C. immediately after thawing | post-30 minutes- steaming | post-45 minutes- steaming |
| --- | --- | --- | --- |
| End portion of the vinegared rice-side surface of the sushi material | 15.8 | 20.1 | 20.3 |

In the boxed sushi product, immediately after the thawing, there was a difference of about 49° C. between the upper center portion in the longitudinal direction of the rice section and the portion of side surface of an end portion of the rice section. When the sushi product was steamed for 30 and 45 minutes, however, temperatures of the shaped rice section and the sushi material exceeded 15° C. in both the post-steaming cases, and the shaped rice section and the sushi material had a substantially uniform temperature distribution, and temperature differences were within a range of about 10° C. or less throughout the sushi product, and the boxed sushi product was easily cut with a kitchen knife.

Figure 3:
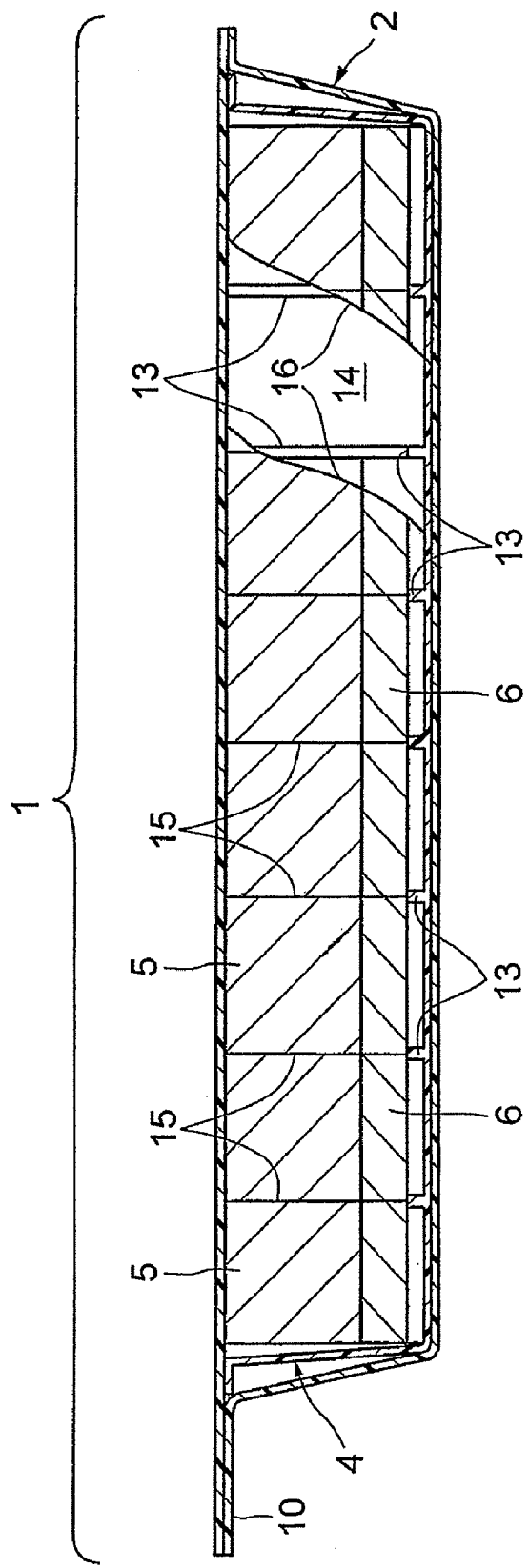
FIG. 3 is a schematic side sectional view schematically illustrating another Embodiment of the present invention.
Figure 4:
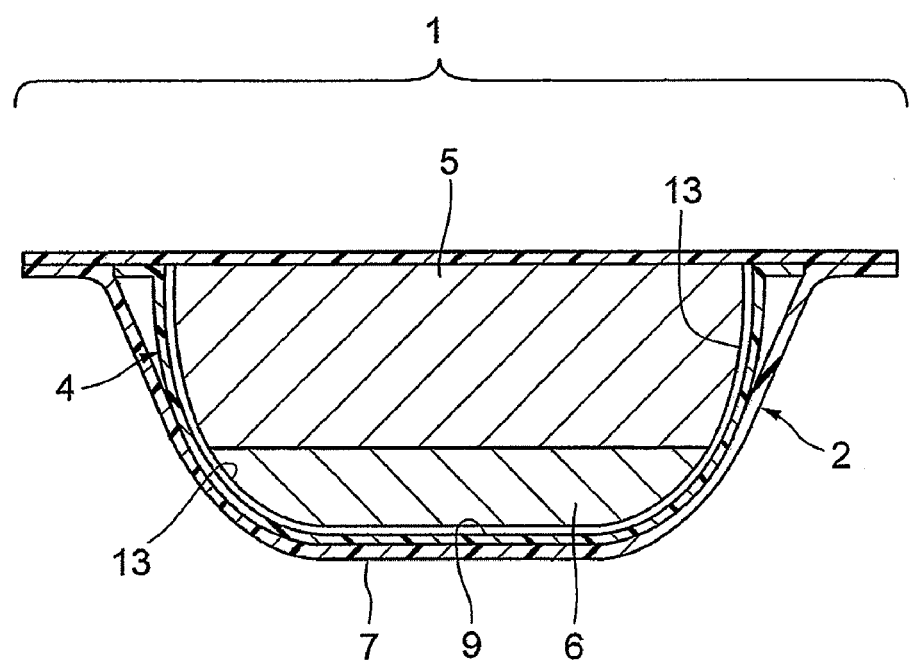
FIG. 4 is a schematic front sectional view schematically illustrating the Embodiment shown in FIG. 3.

In FIGS. 3 and 4, Embodiment is shown which is different from the Embodiment shown in FIGS. 1 and 2. In the Embodiment shown in FIGS. 3 and 4, a box 4 is made of a polypropylene. As shown in FIG. 4, the box 4 has a reversed semicylindrical shape, i.e., reversed kamaboko-like shape. This shape is so designed as to substantially conform with the shape of the sushi product placed on the bottom of the box 4. In other words, the front end of the box 4 has a reversed semicircular shape, i.e., cross-sectional reversed kamaboko shape. This shape is so designed as to substantially conform with the cross-sectional shape of the sushi product placed on the bottom of the box 4. In this Embodiment, the plastic box 4 for containing a packed frozen sushi product 1 is formed with 7 ribs 13 along each of inner walls which inward extend from the inner walls with a view to reinforcing the box 4 and maintaining the shape of the box 4. The sushi product may be contained in the box 4 in such a manner that it is placed on the ribs 13 and through spaces 14 between the ribs 13 with its sushi material or materials 6 down and shaped rice section 5 thereon. In this connection, the sushi product may be provided with cut lines so as to be easily separable into pieces afterward. Alternatively, the sushi product may be cut into pieces and each of the pieces may be placed in the space 14 between the ribs 13 with each rib 13 interposed between pieces. In this Embodiment, the sushi product 8 may be a rod-shaped sushi product or boxed sushi product, and the sushi product 8 is contained in the box 4 in such a manner that it is preliminarily provided with cut lines 15 so as to be easily separable into 8 pieces afterward and placed on the ribs 13. FIG. 3 shows, using cutting lines 16, the ribs 13 and the spaces 14 between the ribs with no sushi product contained in the box. Of course, in this Embodiment, the box may be used as a container for a rod-shaped sushi product or boxed sushi product which is provided with no cut lines. In this Embodiment, the ribs are provided on the inside of the box. However, the ribs may be provided on the outside of the box.

Example 8

Finely chopped shiitake mushrooms which had been reconstituted with water and then cooked in a broth seasoned with sugar, soy sauce and sweet cooking sake' (mirin) and finely chopped gourd shavings (kampyo) which had been reconstituted with water and then cooked in a broth seasoned with sugar, soy sauce and sweet cooking sake' (mirin) were added to vinegared rice prepared as in Example 1 to prepare sushi rice. On the other hand, belly-slit conger eels (anago) were cooked in a broth seasoned with sugar, soy sauce and sweet cooking sake' and cut into strips of 5.5 cm in width and 18 cm in length to make conger eel fillet preparations as a sushi material.

Using 220 g of the sushi rice and 40 g of the conger eel fillet preparation as a sushi material, each of conger eel-topped boxed sushi products of 5.5 cm in width, 18 cm in length and 2.7 cm in thickness (L size) was prepared using a box-shaped sushi mold (hako-gata). The conger eel-topped boxed sushi product (L size) was removed from the sushi mold, and was provided with cut lines so as to be easily separable into 8 pieces afterward, and was placed in a plastic box having a reversed semi-cylindrical shape with its conger eel fillet preparation as a sushi material down. The box had inner dimensions of 6.2 cm in width and 18.2 cm in length in its bottom, and 6.2 cm in width and 19.2 cm in length in its top opening, and 3.0 cm in depth. The box which contained the sushi product was placed in a flexible packing bag made of a laminated film composed of a polyethylene film as an inner layer and a nylon film as an outer layer, and the packing bag was vacuumed by a vacuum pump under a pressure of 40 cmHg and had its mouth heat-sealed. In the vacuumed packing bag, its top portion was depressed and in tight contact with the shaped rice section. Thus vacuumed and heat-sealed packing bag containing the conger eel-topped boxed sushi product (L size) was kept in ethyl alcohol having a temperature of −35° C. as a brine for 45 minutes and thereby brine-frozen to obtain a packed frozen conger eel-topped sushi product (L size).

In the packed frozen conger eel-topped sushi product (L size), the plastic packing bag as an outer covering, the plastic box and the conger eel-topped sushi product as contents were frozen together in a unified form. The packed frozen conger eel-topped sushi products (L size) were stored at −23.4° C. on average.

In cooking the packed frozen conger eel-topped sushi product (L size), a 500 W microwave oven was used. The packed frozen conger eel-topped sushi product (L size) in this Example was placed in the 500 W microwave oven and thawed by applying heat for 3 minutes and 10 seconds. 3 minutes and 10 seconds, which was the same as the time of thawing by the microwave oven, after completion of the thawing, the thawed packed sushi product was removed from the microwave oven and allowed to stand at room temperature of 25° C. for 30 minutes to effect steaming. In this process of steaming, temperatures of given portions were measured immediately after the thawing, after a lapse of 15 minutes in the steaming (in the Table, referred to simply as "15 minutes later"), and after a lapse of 30 minutes for the steaming (in the Table, referred to simply as "30 minutes later"). The results are shown in Table 8.

In Table 8, "Portion of side surface of an end portion of the rice section" represents the temperatures of a corner portion in the shaped rice section, where three edges of the sides not in contact with the sushi material meet together. Also, "Center portion of the upper surface of the rice section" represents the temperatures of a portion at the center in the longitudinal direction and in the width direction of the upper surface of the sides not in contact with the sushi material. Also, "End portion of the box-side surface of the sushi material" represents the temperatures of a portion located 1 cm inner from the end of the sushi material surface in contact with the bottom of the plastic container. Further, "Center portion of the upper surface of the sushi material" represents temperatures of a portion at the center in the longitudinal direction and in the width direction of the sushi material surface in contact with the bottom of the plastic container. Furthermore, "End portion of the rice-side surface of the sushi material" represents temperatures of a portion located 1 cm inner from the end of the sushi material surface in contact with the rice section.

TABLE 8

|  | Temp. ° C. immediately after thawing | post-15 minutes- steaming | post-30 minutes- steaming |
|---|---|---|---|
| Portion of side surface of an end portion of the rice section | 62.9 | 36.1 | 23.3 |
| Center portion of the upper surface of the rice section | 38.0 | 10.7 | 16.5 |
| End portion of the box-side surface of the sushi material | 43.9 | 21.7 | 22.5 |
| Center portion of the upper surface of the sushi material | 43.9 | 7.2 | 13.4 |
| End portion of the rice-side surface of the sushi material | 15.8 | 21.8 | 22.0 |

In the packed sushi product, immediately after thawing, there was a difference of about 25° C. between the temperatures of the center portion of the upper surface of the rice section and the portion of side surface of an end portion of the rice section. 30 minutes after leaving the sushi product to steam, however, the temperatures of the shaped rice section and the sushi material were above 13° C. or higher, and temperature distribution in the sushi product became roughly uniform, and the overall temperature differences were within a range of about 10° C. or less, enabling the thawed boxed-sushi product to be cut easily with a kitchen knife.

Also, in this Example, the sushi product was sufficiently thawed after 30 minutes of steaming time, however, when the sushi product was closely wrapped with a wrapping film so that the volume ratio of the space to the sushi product was less than 0.1, 45 minutes of steaming time or longer was required, indicating that there was a reduction of 15 minutes or more in the steaming time required.

Example 9

210 g of vinegared rice prepared as in Example 5 was spread on a sheet of nori seaweed and 40 g of core was placed on top of the spread out vinegared rice to prepare a round bar-shaped thick-rolled sushi product of 5 cm diameter and 14.5 cm in length (S size) using a sushi rolling machine for thick-rolled sushi or the like. In this Example, the following ingredients were used as the core as was seen in Example 5; 1) finely chopped shiitake mushrooms which had been reconstituted with water and then cooked in a broth seasoned with with sugar, soy sauce and sweet cooking sake' (mirin); 2) gourd shavings (kampyo) which had been reconstituted with water and then cooked in a broth seasoned with sugar, soy sauce and sweet cooking sake' (mirin) and folded in half; 3) Egg seasoned with stock and seasonings such as sugar and soy sauce and cooked into box-shaped Japanese thick omelet, which was then cut into a stick-shape with 1 cm width, 1 cm height and 14.5 cm length; and 4) Boiled Japanese mitsuba herb cut in appropriate length.

The thick-rolled sushi product (S size) thus prepared was cut into 8 equal pieces and placed in a plastic box having a rectangular parallelepipedonal shape. The box had inner dimensions of 5.5 cm in width, 15.0 cm in length and 5.0 cm in depth in its bottom. The box which contained the sushi product was placed in a flexible packing bag made of a laminated film composed of a polyethylene film as an inner layer and a nylon film as an outer layer, and the packing bag was vacuumed by a vacuum pump under a pressure of 40 cmHg and had its mouth heat-sealed. In the vacuumed packing bag, its top portion was depressed and in tight contact with the top surface of the thick-rolled sushi product. The volume around the sushi product inside the packing bag (the volume of the space) was 76 cubic centimeter and the volume ratio of the space to the sushi product was 0.241. The packing bag, in which the thick-rolled sushi product had been placed together with the plastic box containing the same and which had been vacuumed and heat-sealed, was kept in ethyl alcohol having a temperature of −35° C. as a brine for 45 minutes and thereby brine-frozen to obtain a packed frozen thick-rolled sushi product (S size). In the packed frozen thick-rolled sushi product (S size), the plastic packing bag as an outer covering, the plastic box and the thick-rolled sushi product as contents were frozen together in a unified form. The packed frozen thick-rolled sushi products (S size) were stored at −21.5° C. on average.

In cooking the packed frozen thick-rolled sushi product (S size), a 500 W microwave oven was used.

The packed frozen thick-rolled sushi product (S size) in this Example was placed in the 500 W microwave oven and thawed by applying heat for 3 minutes. 3 minutes, which was the same as the time of thawing by the microwave oven, after completion of the thawing, the thawed packed sushi product was removed from the microwave oven and allowed to stand at room temperature for 30 minutes to effect steaming. In this process of steaming, temperatures of given portions were measured immediately after the thawing, after a lapse of 15 minutes in the steaming (in the Table, referred to simply as "15 minutes later"), and after a lapse of 30 minutes for the steaming (in the Table, referred to simply as "30 minutes later"). The results are shown in Table 9.

In Table 9, "Portion of the upper surface the end of the rice section" represents temperatures of a portion in the rice section in contact with the seaweed at the exposed end of the thawed sushi product. Also, "Center portion of the upper surface of the rice section" represents temperatures of a portion on the surface of the seaweed at the center in the longitudinal direction and in the width direction. Furthermore, "Center portion inside the rice section" represents temperatures of a portion at 2 mm depth from the surface of the seaweed at the center in the longitudinal direction and in the width direction. Also, "Sushi material section" represents temperatures of the sushi material at 2.5 cm depth from the surface of the seaweed at the center in the longitudinal direction and in the width direction.

TABLE 9

|  | Temp. ° C. immediately after thawing | post-15 minutes-steaming | post-30 minutes-steaming |
| --- | --- | --- | --- |
| Portion of the upper surface of the end of the rice section | 71.4 | 29.3 | 27.2 |
| Center portion of the upper surface of the rice section | 3.1 | 12.9 | 15.7 |
| Center portion inside the rice section | −1.7 | 12.1 | 15.4 |
| The sushi materials section | −4.6 | 7.4 | 12.2 |

In the thick-rolled sushi product (S size), immediately after thawing, there were differences of 68 to 76° C. between the center portions in the longitudinal direction and the longitudinal end portion of the shaped rice portion. However, 30 minutes after leaving the sushi product to steam, the temperatures of the shaped rice section and the sushi material were about 10° C. or higher, and the overall temperature differences were within a range of 15° C. or less, enabling the thawed thick-roll sushi product to be cut easily with a kitchen knife.

INDUSTRIAL APPLICABILITY

The packed frozen sushi product of the present invention comprises a vacuumed and frozen plastic packing bag, an open-topped plastic box placed in the packing bag, a laminated metal foil placed on the bottom of the box, and a frozen sushi product having a shaped rice section topped with a sushi material or materials, and these are frozen together in a unified form. Accordingly, a space having a volume of one-tenth or more of that of the sushi product is formed around the sushi product, and when the sushi product is thawed using a microwave oven, flow of generated water vapor is promoted through the space to steam the thawed sushi product. This enables the sushi product to have a roughly uniform temperature distribution in a relatively short period of time. Accordingly, in the present invention, the packed frozen sushi product can be thawed and steamed with the water vapor generated in the thawing to enable the thawed sushi product to have desired approximated temperatures, and thus the resulting sushi product can be eaten delectably. As described above, the packed frozen sushi product of the present invention can be cooked simply and easily, and thus non-uniformity of temperatures inherent in thawing is solved. By virtue of this, boxed sushi products using a seasonal sushi material or materials which have been frozen and stored can delectably be served irrespective of season.

Further, in the present invention, the packed frozen sushi product which is hygienically excellent can simply be prepared by placing a sushi product in a plastic box, and vacuum-packing and freezing the resultant, and this procedure can be relatively easily performed. Accordingly, the packed frozen sushi product can be prepared mechanically and thus efficiently on a large scale. Further, it has been considered difficult but is now realized that the procedure to prepare the frozen packed sushi product may be performed almost mechanically with no substantial manual intervention and thus easily automatized to enable frozen packed sushi products of high quality to regularly be produced. Therefore, the present invention has a high industrial applicability.

The invention claimed is:

1. A microwavable vacuum-packed frozen sushi product comprising:

a vacuumed and hermetically sealed flexible microwave-safe plastic packing bag which is vacuumed to pressure of 600 mm Hg or lower;

an open-topped plastic box having a top opening and a bottom, the top opening of which is formed as to be broader than the bottom, placed in said packing bag;

in the packing bag, a space being formed around the sushi product in the vacuumed condition, which provides interspaces between the sushi product and the plastic box and between the plastic box and the packing bag; and a frozen sushi product which is formed by at least one shaped form of frozen boiled rice and a sushi material placed on a surface of each form of said at least one shaped form of frozen boiled rice, placed in said box;

an inner surface of plastic packing bag being in contact with surface of the sushi material or the boiled rice of said sushi product, and an inner surface of plastic box being in contact with the surface of the sushi material and the boiled rice which is different from said contacting surface, a space being formed in said plastic packing bag around said sushi product, said packing bag, said box and said sushi product being frozen together in a unified form, the space formed around the sushi product in said packing bag having a volume 0.2 to 0.6 times that of sushi product at the time of thawing by means of microwave, and after thawing, a resulting packed sushi product being able to stand for a period of 15 to 30 minutes without unpacking, allowing water vapor emanating at least from the shaped rice section to flow in a space formed between the sushi product and the box, thereby steaming the shaped rice section and the sushi material or materials between 15° C. and 30° C.

2. The microwavable vacuum-packed frozen sushi product according to claim 1, wherein the box is a box or a shallow cylinder-container.

3. The microwavable vacuum-packed frozen sushi product according to claim 1, wherein the microwave-safe plastic packing bag is made of a laminated film composed of a nylon film and a polypropylene film having a thickness larger than that of the nylon film.

* * * * *